(12) United States Patent
Bageshwar et al.

(10) Patent No.: US 11,662,472 B2
(45) Date of Patent: May 30, 2023

(54) INTEGRITY MONITORING OF ODOMETRY MEASUREMENTS WITHIN A NAVIGATION SYSTEM

(71) Applicant: Honeywell International Inc., Charlotte, NC (US)

(72) Inventors: Vibhor L Bageshwar, Rosemount, MN (US); Shrikant P. Rao, Bangalore (IN); Vijay Venkataraman, Excelsior, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/156,203

(22) Filed: Jan. 22, 2021

(65) Prior Publication Data

US 2021/0325544 A1    Oct. 21, 2021

(30) Foreign Application Priority Data

Apr. 20, 2020    (IN) .............................. 202041016982

(51) Int. Cl.
*G01S 19/20*    (2010.01)
*G01S 19/52*    (2010.01)
*G01C 21/16*    (2006.01)

(52) U.S. Cl.
CPC ............ *G01S 19/20* (2013.01); *G01C 21/165* (2013.01); *G01S 19/52* (2013.01)

(58) Field of Classification Search
CPC .......... G01S 19/20; G01S 19/52; G01S 19/39; G01S 19/393; G01C 21/165

(Continued)

(56) References Cited

U.S. PATENT DOCUMENTS

| 5,760,737 A | 6/1998 | Brenner |
| 8,497,798 B2 | 7/2013 | Schloetzer |

(Continued)

FOREIGN PATENT DOCUMENTS

| CN | 101598557 B | 5/2012 |
| CN | 103884340 A | 6/2014 |
| WO | 2001020360 A1 | 3/2001 |

OTHER PUBLICATIONS

Ahlbrecht et al., "High Integrity Positioning: Lessons from the Aviation Industry", Dynamic Positioning Conference, Oct. 2010, pp. 1-16, Dynamic Positioning Committee.

(Continued)

*Primary Examiner* — Harry K Liu
(74) *Attorney, Agent, or Firm* — Fogg & Powers LLC

(57) ABSTRACT

Systems and methods for integrity monitoring of odometry measurements within a navigation system are provided herein. In certain embodiments, a system includes imaging sensors that generate image frames from optical inputs. The system also includes a GNSS receiver that provides pseudorange measurements; and computational devices that receive the image frames and the pseudorange measurements. Further, the computational devices compute odometry information from image frames acquired at different times; and calculate a full solution for the system based on the pseudorange measurements and the odometry information. Additionally, the computational devices calculate sub-solutions for the system based on subsets of the pseudorange measurements and the odometry information, wherein one of the sub-solutions is not based on the odometry information. Moreover, the computational device determines the integrity of the pseudorange measurements, the odometry information, and a position estimated by the navigation system based on a comparison of the full and sub-solutions.

20 Claims, 4 Drawing Sheets

(58) Field of Classification Search
USPC .................................................. 342/357.22
See application file for complete search history.

(56) References Cited

U.S. PATENT DOCUMENTS

| | | | |
|---|---|---|---|
| 8,976,064 | B2 | 3/2015 | Brenner |
| 9,031,782 | B1 | 5/2015 | Lemay et al. |
| 9,978,285 | B2 | 5/2018 | Khaghani et al. |
| 10,247,573 | B1 | 4/2019 | Gavrilets et al. |
| 10,267,924 | B2 | 4/2019 | Ramanandan et al. |
| 10,371,530 | B2 | 8/2019 | Ramanandan et al. |
| 2016/0202359 | A1 | 7/2016 | Kana et al. |
| 2016/0327653 | A1 | 11/2016 | Humphreys et al. |
| 2017/0350973 | A1 | 12/2017 | Dunik et al. |
| 2018/0088597 | A1 | 3/2018 | Shen |
| 2019/0219400 | A1 | 7/2019 | Wang et al. |

OTHER PUBLICATIONS

Baine, "Integrity Monitoring for Multiple Errors in Vision Navigation Systems", A dissertation submitted in partial fulfillment of the requirements for the degree of Doctor of Philosophy, May 17, 2013, pp. 1-151, Wright State University.

Brenner, "Integrated GPS/Inertial Fault Detection Availability", Journal of The Institute of Navigation, 1996, pp. 111-130, Navigation.

Calhoun et al., "Integrity Determination for a Vision Based Precision Relative Navigation System", 2016, pp. 294-304, IEEE.

Calhoun, "Integrity Determination for Image Rendering Vision Navigation", Dissertation, Department of the Air Force Air University, Mar. 2016, pp. 1-152, Air Force Institute of Technology.

Jia, "Data Fusion Methodologies for Multisensor Aircraft Navigation Systems", Thesis for the Degree of Doctor of Philosophy, Apr. 2004, pp. 1-264, Cranfield University.

Kana et al., "Architectures for High Integrity Multi-Constellation Solution Separation", Proceedings of the 27th International Technical Meeting of the ION Satellite Division, ION GNSS+ 2014, Sep. 2014, pp. 3554-3565.

Larson, "An Integrity Framework for Image-Based Navigation Systems", Dissertation, Department of the Air Force Air University, Jun. 2010, pp. 1-233, Air Force Institute of Technology.

Mourikis et al., "SC-KF Mobile Robot Localization: A Stochastic Cloning Kalman Filter for Processing Relative-State Measurements", IEEE Transactions on Robotics, Aug. 2007, pp. 717-730, vol. 23, No. 4, IEEE.

Vanderwerf, "FDE Using Multiple Integrated GPS/Inertial Kalman Filters in the Presence of Temporally and Spatially Correlated Ionosphere Errors", ION GPS, Sep. 2001, pp. 2676-2685.

European Patent Office, "Extended European Search Report from EP Application No. 21166800.9", from Foreign Counterpart to U.S. Appl. No. 17/156,203, dated Sep. 14, 2021, pp. 1 through 9, Published: EP.

Popp et al. "A Novel Multi Image Based Navigation System to Aid Outdoor Indoor Transition Flights of Micro Aerial Vehicles", Proceedings of the 27th International Technical Meeting of the ION Satellite Division, ION GNSS+, Sep. 2014, pp. 1595 through 1608, Tampa, Florida.

INTEGRITY MONITORING OF ODOMETRY MEASUREMENTS WITHIN A NAVIGATION SYSTEM

CROSS-REFERENCE TO RELATED APPLICATION

The present application claims benefit of Indian Patent Application Serial No. 202041016982 filed Apr. 20, 2020; the entire contents of the aforementioned patent application is incorporated herein by reference as if set forth in its entirety.

BACKGROUND

Vehicles frequently have navigation systems that acquire information about the motion, position, and angular orientation of the vehicle and calculate navigation data from the acquired information. To acquire the information used to calculate the navigation data, some navigation systems may include a sensor set having an inertial measurement unit (IMU) and/or a global navigation satellite system (GNSS) antenna/receiver that provide measurements related to vehicle motion and vehicle position. Additionally, the navigation system may process the measurements using a Kalman filter to estimate the position, velocity, and angular orientation of the vehicle, or vehicle kinematics, relative to defined reference frames and apply corrections to the measurements provided by the sensors.

Additionally, some navigation systems are used in safety-critical navigation applications. In safety-critical navigation applications, it is important to ensure that the sensors are providing reliable measurements. Accordingly, the measurements and other output provided by the sensors may be continuously monitored to gauge the health of the sensors, the integrity of measurements provided by the sensors in the navigation system, and the integrity of the vehicle kinematics estimated by the navigation system.

Frequently, monitoring the health of the sensors, integrity of the sensor measurements, and the integrity of the vehicle kinematics estimated by the navigation system is achieved by exploiting the redundancy in the sensor measurements provided by the various sensors, and by using probabilistic algorithms to detect faults and estimate kinematic errors during fault free operations. One example of a method used to monitor the integrity of measurements used by a navigation system is a solution separation technique.

Additionally, measurements for use in navigation may be provided by imaging sensors. Image based sensors may include cameras, radars, lidars, or other systems that identify and measure features located in the environment around the vehicle. Imaging sensors may typically provide measurements in the form of two-dimensional (2D) images and/or point clouds. Using information acquired at different times, features in the environment may be tracked to provide reference points by which a processor can provide navigation measurements. In particular, the navigation measurements calculated from the image data may include information about the position, velocity, and angular orientation of the vehicle relative to the features identified in the acquired image data.

In some embodiments, the information acquired from the imaging sensors may be used in combination with measurements from other sensors such as the IMU and GNSS receiver to aid in the calculation of statistical estimates of the kinematic states of the vehicle and to maintain navigation system performance when GNSS measurements or other sensor measurements are unavailable.

SUMMARY

Systems and methods for integrity monitoring of odometry measurements within a navigation system are provided herein. In certain embodiments, a system includes one or more imaging sensors configured to generate a plurality of image frames from optical inputs. The system also includes a global navigation satellite system (GNSS) receiver configured to provide pseudorange measurements. Additionally, the system includes one or more computational devices configured to receive the plurality of image frames and the pseudorange measurements. Further, the one or more computational devices are configured to compute odometry information from two or more image frames in the plurality of image frames, wherein the two or more image frames were acquired at different times. Also, the one or more computational devices are configured to calculate a full solution for the system based on the pseudorange measurements and the odometry information. Additionally, the one or more computational devices are configured to calculate a plurality of sub-solutions for the system based on subsets of the pseudorange measurements and the odometry information, wherein at least one sub-solution in the plurality of sub-solutions is not based on the odometry information. Moreover, the one or more computational device are configured to determine the integrity of the pseudorange measurements, the odometry information, and a position estimated by the navigation system based on a comparison of the full solution and the plurality of sub-solutions.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The systems and methods described herein provide for the integrity monitoring of odometry information within a navigation system. In particular, the integrity monitoring is performed based on a solution separation methodology where measurements from a vision based sensor are incorporated with inertial and/or GNSS measurements. The proposed method may be used to detect and isolate faults in the measurements from the GNSS receiver and the vision based sensors and to compute protection levels for the measurements.

Figure 1:
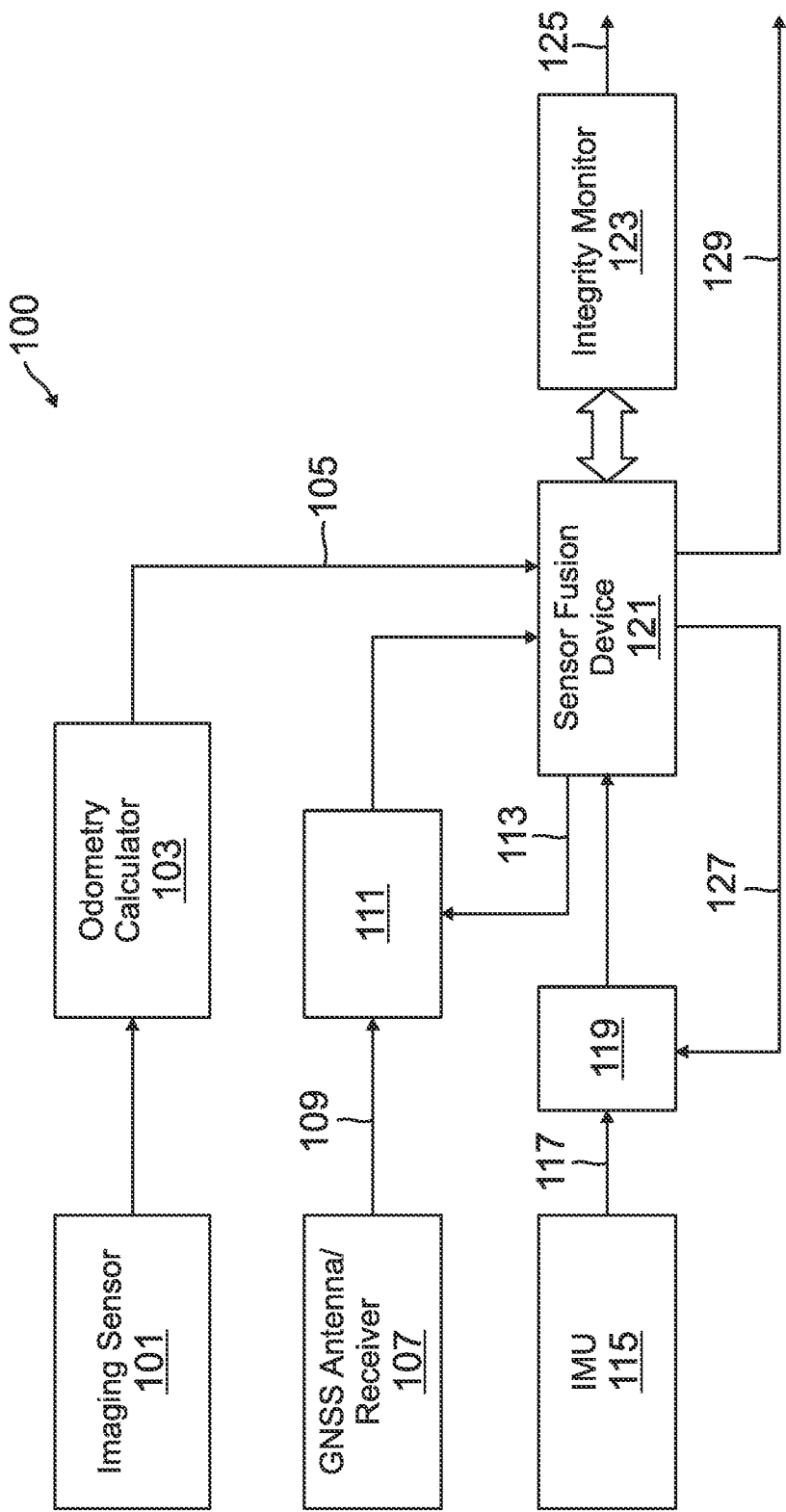
FIG. 1 is a block diagram of a navigation system according to an aspect described in the present disclosure.

FIG. 1 is a block diagram illustrating a navigation system 100 that fuses together information from various sources of navigation information. For example, the navigation system 100 may include an imaging sensor 101, a GNSS antenna/receiver 107, an IMU 115, and/or other sensors (not shown but may include barometers, velocimeters, altimeters, magnetometers, star trackers, and the like) capable of providing navigation information. Additionally, various components within the navigation system 100 may be implemented within or in communication with one or more processing units. Also, the components within the navigation system 100 may provide information for storage on or acquire information stored on one or more memory units.

As used herein, one or more computational devices, such as a processing unit or other computational device, used in the present system and methods may be implemented using software, firmware, hardware, circuitry, or any appropriate combination thereof. The one or more computational devices may be supplemented by, or incorporated in, specially-designed application-specific integrated circuits (ASICSs) or field programmable gate arrays (FPGAs). In some implementations, the one or more computational devices may communicate through an additional transceiver with other computing devices outside of the navigation system 100. The one or more computational devices can also include or function with software programs, firmware, or other computer readable instructions for carrying out various process tasks, calculations, and control functions used in the present methods and systems.

The present methods may be implemented by computer executable instructions, such as program modules or components, which are executed by at least one computational device. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processing unit, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

As mentioned above, the navigation system 100 may include an imaging sensor 101. As used herein, an imaging sensor may be any sensor capable of acquiring information from the environment through which an object, such as a vehicle, is traveling. In particular, the imaging sensor 101 may acquire information from the environment through which a vehicle travels by detecting information reflected by objects within an observed field of view in the environment. For example, the imaging sensor 101 may detect light, sound, electromagnetic radiation, and the like. In some implementations, the imaging sensor 101 may emit signals towards objects in the environment through which the navigation system 100 is traveling and the imaging sensor 101 may detect the reflected signals. For example, the imaging sensor 101 may be one of or a combination of an Electro-optical/Infrared camera (EO/IR), radar, sonar, lidar, or a similar image capture system.

In some embodiments, the imaging sensor 101 may include multiple imaging sensors. Further, the multiple imaging sensors in the imaging sensor 101 may be the same type of sensors (i.e. multiple cameras) or implement multiple image sensing technologies. Additionally, the fields of view associated with each of the sensors in the imaging sensor 101 may be non-overlapping. Alternatively, the fields of view associated with each of the sensors may overlap or even be substantially identical. Depending on the sensor type, information acquired from multiple sensors having overlapping fields of view may be subsequently processed to acquire three-dimensional (3D) descriptions of objects in the observed environment.

When capturing information from the environment observed by the imaging sensor 101, the imaging sensor 101 may capture multiple frames of image data describing the environment. Generally, a frame of image data contains information describing features within the observed environment. The information can be extracted and matched to similar information in other frames acquired at different times to determine the relative position and angular orientation of the imaging sensor 101 and the attached system 100 relative to the environment.

An image frame captured by an imaging sensor 101 may be characterized by a 2D grid of pixels, a 3D point cloud, statistical descriptors, other types of information that could capably describe objects within an environment for subsequent comparisons. For example, a feature within an image frame may be a collection of pixels or points that are distinguishable from the surrounding pixels. The features may be points having particular relationships to neighbors, planes, textures, statistical distributions, and the like. Generally, identified features described in the image frame correlate to objects in the environment. As discussed above, features found in multiple image frames may be tracked either by identifying the collections of pixels or points as the same objects, or by estimating the position of features using measurements from systems other than the imaging sensor 101.

The image frames captured by the imaging sensor 101 may be analyzed by an odometry calculator 103. The odometry calculator 103 may use information that describes matched features in the frames of image data to generate odometry information 105. Additionally, the navigation system 100 may store information used by the odometry calculator 103 that describes the tracked features from multiple image frames acquired at different times. In some embodiments, a memory unit, in communication with or part of the functionality ascribed to the odometry calculator 103 and/or imaging sensor 101, may store information describing extracted features from the image frames. As the imaging sensor 103 captures sequential images, one or more features identified within an image-frame may correspond to features identified in previously and/or subsequently acquired image frames.

In some embodiments, the odometry calculator 103 may provide odometry information 105 for the navigation system 100. For example, the odometry calculator 103 may use information describing one or more features acquired from the different image frames to calculate the position and angular orientation of the navigation system 100 in relation to the objects observed in the environment that are associated with the extracted features. Accordingly, the odometry information 105 provided by the odometry calculator 103 may be associated with relative kinematic state measurements, such as the relative position and relative angular orientation of the navigation system 100 in relation to identified features in the observed environment. In particular, the odometry calculator 103 may provide odometry information 105 for the navigation system 100 that occurred between the times associated with different acquired image frames.

Additionally, while the odometry information 105 provided by the odometry calculator 103 are relative kinematic state measurements, such as relative position and relative angular orientation of the navigation system 100, the odometry information 105 may be used in combination with data provided by other sources of navigation information to identify absolute kinematic state measurements for the navigation system 100. As used herein, an absolute kinematic state measurement may refer to a measurement or measurements that are referenced against a reference frame with origin not within the immediately observable environment. For example, the absolute kinematic state measurements may be in reference to the Earth centered Earth fixed frame, or other similar frames of reference. One common method of using the measurements provided by the odometry calculator 103 to identify absolute kinematic state measurements is by associating information stored within a map database with identified features in the environment using methods such as landmark based localization or other techniques for associating identified features.

In further embodiments, the odometry information 105 may be provided to a sensor fusion device 121 that combines measurements from other aiding sources to provide absolute kinematic state measurements 129 of the position, velocity, and angular orientation of the vehicle or object associated with the navigation system 100. The other aiding sources may include a GNSS antenna/receiver 107, an inertial measurement unit (IMU) 115, or other sources of potential navigation information. The sensor fusion device 121 may combine the translation and angular orientation changes 105 with the measurements provided by the GNSS antenna/receiver 107 and the IMU 115 to provide absolute kinematic state measurements 129.

In certain embodiments, the GNSS antenna/receiver 107 may include at least one antenna that receives satellite signals from GNSS satellites. A GNSS satellite, as used herein, may refer to a space-based satellite that is part of a global navigation satellite system that provides autonomous geo-spatial positioning with global coverage. Generally, a GNSS receiver receives line-of-sight signals from GNSS satellites and calculates a geo-spatial position based on the signals received from multiple GNSS satellites. Examples of GNSS systems may include the Global Positioning System (GPS) maintained by the United States government, the Galileo system maintained by the European Union (EU) and European space agency (ESA), the BeiDou navigation system maintained by China, among other navigation systems maintained by various national governments and political entities.

In certain embodiments, a computational device coupled to the GNSS antenna/receiver 107 may receive carrier phase measurements from GNSS satellites and output pseudorange measurements 109 within the line of sight of the GNSS antenna/receiver 107. When the computational device receives measurements from four or more satellites, the computational device may calculate location information for the navigation system 100 anywhere on or near the Earth. In particular, during operation, the GNSS antenna/receiver 107 may extract the time and carrier phase data from the signals received from visible GNSS satellites and provide the pseudorange measurements 109 to the computational device. The computational device may derive position information for the navigation system 100.

In certain embodiments, the GNSS antenna/receiver 107 may provide the pseudorange measurements 109 or position information calculated therefrom to the sensor fusion device 121, the sensor fusion device 121 may fuse the relative position information based on measurements from the odometry calculator 103 with the absolute position information acquired from the GNSS antenna/receiver 107. Accordingly, when the navigation system 100 passes through GNSS denied environments, the navigation system 100 may use previously received GNSS measurements fused with previously received odometry information from the odometry calculator 103 to predict current position estimates and update the predicted current position estimates using the recently received information from the odometry calculator 103. Additionally, the sensor fusion device 121 may provide pseudorange corrections 113 to a pseudorange correction device 111 to adjust the pseudorange measurements 109 based on calculated estimates by the sensor fusion device 121.

In additional embodiments, the navigation system 100 may include an IMU 115 that provides inertial measurements 117 to an inertial navigation system 119 to provide inertial estimates of position, velocity, and angular orientation. In particular, the IMU 115 may include multiple inertial sensors that detect the motion of the navigation system 100. For example, the IMU 115 may include multiple gyroscopes that measure rates of rotation along one or more axes and accelerometers that measure acceleration along one or more axes. The IMU 115 may provide inertial measurements 117 to the inertial navigation system 119 which may provide inertial estimates of position, velocity, and angular orientation to the sensor fusion device 121 for fusion with the measurements from the GNSS antenna/receiver 107 and the odometry calculator 103. The sensor fusion device 121 may also provide inertial measurement corrections 127 to an inertial navigation system 119 for correcting inertial kinematic state estimates based on information received from other sensors, such as the GNSS antenna/receiver 107 and the odometry calculator 103.

In certain embodiments, as described above, the sensor fusion device 121 may provide absolute kinematic state estimates 129 for use by other systems connected to the navigation system 100. Additionally, the sensor fusion device 121 may provide information to an integrity monitor 123. As used herein, the integrity monitor 123 may refer to a device, or series of devices, that are capable of assuring the integrity of measurements provided by the different aiding sensors in the navigation system 100, in particular, the measurements provided by the imaging sensor 101 and the GNSS antenna/receiver 107 and the integrity of the absolute kinematic state estimates 129. The integrity monitor 123 may indicate whether measurements acquired from the imaging sensor 101 and the GNSS antenna/receiver 107 are trustable, that is whether the information provided by the various sources can be trusted as correct. Further, the integrity monitor 123 may indicate whether the absolute kinematic state estimates 129 provided by the sensor fusion device 121 are trustable. Integrity monitoring may include, the ability of a system to provide timely (within limits specified by a time-to-alert) and valid warnings to a user that particular sources of information are not to be used for an intended operation or phase of travel. As part of these warnings, the integrity monitor 123 may calculate one or more protection levels. For measurements from a particular sensor to be considered available for particular intended operation or phase of travel, the protection level associated with an absolute kinematic state should be less than a specified alert limit. If the protection level exceeds the allowed alert limit, then the measurements provided by the associated sources should not be used to calculate navigation information and that absolute kinematic state should not be used by other systems connected to the navigation system 100.

In certain embodiments, integrity monitoring algorithms are based on a solution separation methodology. In a solution separation methodology, a system determines a full solution and one or more sub-solutions, where the full solution is calculated based on information acquired from a full set of measurements from available information sources and the sub-solutions are calculated based on information acquired from subsets of the full set of measurements from the available information sources. As used herein, a solution may refer to a position solution, a navigation solution, or other solution acquired from measurements as described herein. Using the full solution and the sub-solutions, their covariances, and the covariances of the separation between them, a system may determine the integrity of the full solution.

The integrity monitor 123 may use the solution separation methodology, described in greater detail below, to determine the integrity of a position solution calculated from information acquired from navigation satellites through the GNSS antenna/receiver 107 and from the odometry calculator 103. For example, the main position solution may incorporate a set of pseudoranges from all available satellites that are used to correct the position solution estimated using the inertial navigation system 119, where the sub-solutions are based on a subset of the pseudoranges from the available satellites. Also, the main position solution may incorporate changes in relative translation and relative angular orientation from the odometry calculator 103. The system may then determine the integrity or protection levels for the main position solution based on differences or separation statistics between the main position solution and the position sub-solutions.

As used herein, a protection level may refer to a statistical bound to the position error of a position solution that is calculated using the information from the navigation satellites through the GNSS antenna/receiver 107 and from the imaging sensors 101 through the odometry calculator 103. The protection level may define the distance between the edge of a region and the true position of a vehicle that is assured to contain the indicated position of the vehicle containing the navigation system 100 with a certain defined probability. Accordingly, the protection level defines a region used to determine whether the missed alert and false alert requirements are met. Further, the protection level is a function of the actual measurements and the value of the protection level is predictable given reasonable assumptions regarding the expected position error characteristics.

Figure 2:
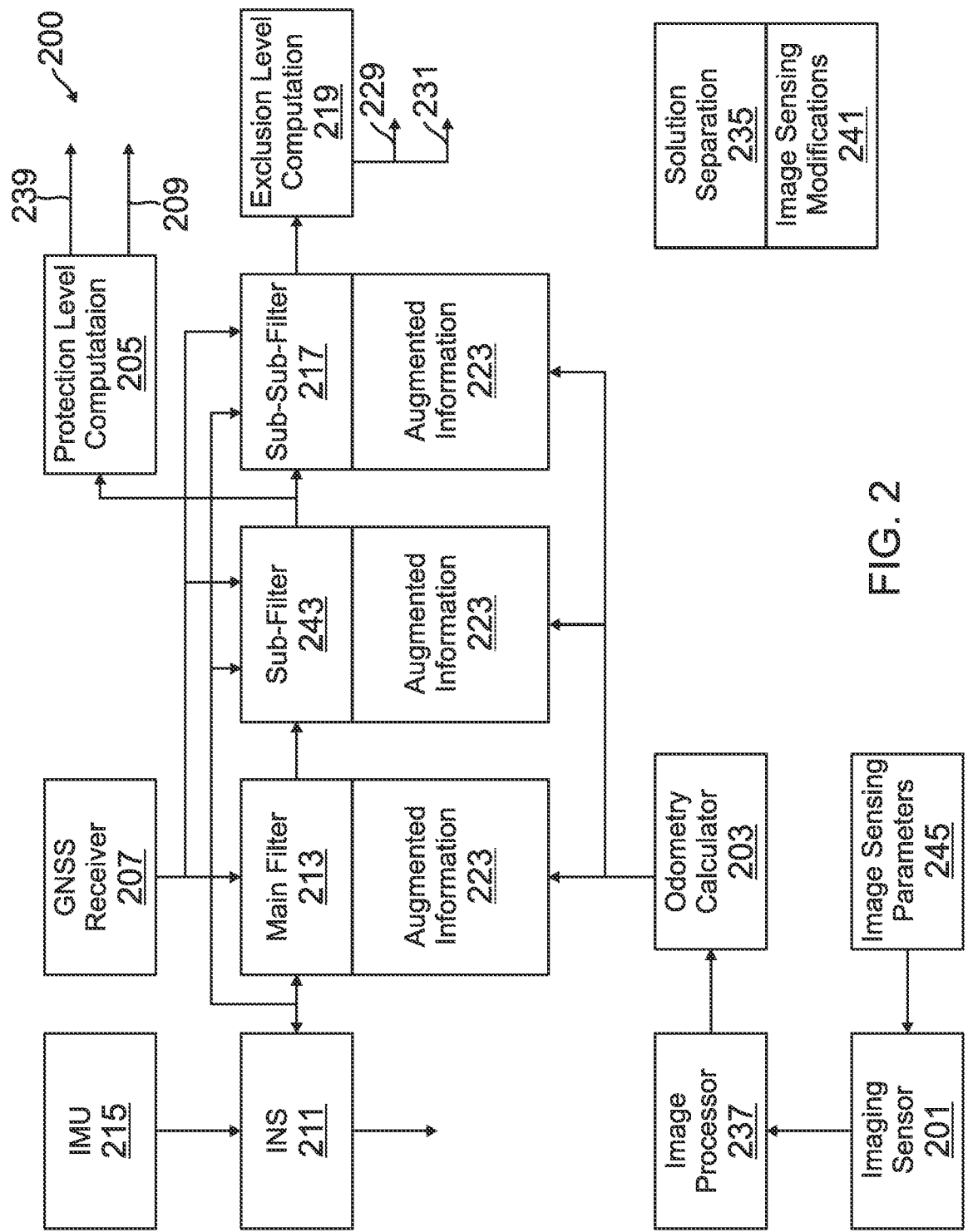
FIG. 2 is a block diagram of a system for performing integrity monitoring of odometry information within a navigation system according to an aspect described in the present disclosure.

FIG. 2 is a block diagram illustrating a navigation system 200 according to embodiments described herein. As shown in FIG. 2, the navigation system 200 may include an imaging sensor 201, an odometry calculator 203, a GNSS receiver 207, and an IMU 215. The imaging sensor 201, odometry calculator 203, GNSS receiver 207, and IMU 215 may function substantially similar as described above with respect to the imaging sensor 101, the odometry calculator 103, the GNSS antenna/receiver 107, and the IMU 115 in FIG. 1.

In some embodiments, the imaging sensor 201 may receive image sensing parameters 245. Image sensing parameters 245 may include information regarding feature locations within the environment observed by the imaging sensor 201. For example, a map database, terrain information, or other information regarding feature locations. Further, image sensing parameters 245 may include information that describes the position of the sensor in relation to a vehicle containing the imaging sensor 201 and intrinsic parameters of the imaging sensor 201.

In certain embodiments, the imaging sensor 201 provides acquired image frame data to an image processor 237. The image processor 237 may be a processing device (such as the computational device described above with respect to FIG. 1). The image processor 237 may extract feature descriptors from the data provided by the imaging sensor 201. For example, extracted feature descriptors may include points that define planes, points, orientations of the various points and planes, statistical descriptions, histograms, image intensity, reflectivity of observed surfaces, and the like. Using the information acquired by the imaging sensor 201 for multiple images acquired at different times, the image processor 237 may also execute feature matching algorithms for the features identified in the multiple image frames. The image processor may provide information regarding the features identified in multiple image frames to an odometry calculator 203, where the odometry calculator may calculate changes in relative angular orientation and relative translation with respect to the features based on differences between the feature locations in separate images for a matched feature. The odometry calculator 203 may then provide the relative angular orientation and relative translation information for subsequent processing and fusion with the measurements provided by the IMU 215 and the GNSS receiver 207.

For example, the odometry calculator 203 and image processor 237 may compare data associated with pairs of image frames in consecutively acquired image frames to determine the relative rotation and relative translation of the imaging sensor 201. In some implementations, the odometry calculator 203 may provide rotation information dR, where dR is a 3x3 rotation matrix that describes the rotation of the vehicle during the time between the capture of the consecutively acquired image frames by the imaging sensor 201. Also, the odometry calculator 203 may provide position information dT, where dT is the change in position of the vehicle during the time between the capture of the consecutively acquired image frames by the imaging sensor 201. Further, both dR and dT may be calculated at the same measurement frequency, which may also be equal to the frequency at which images are captured by the imaging sensor 201. Also, the frequency at which images are captured by the imaging sensor 201 may be equal to the frequency at which other measurements from other sensing devices (IMU 215 and GNSS receiver 207) are calculated. Further dR and dT may be calculated at different frequencies from one another and from other devices within the navigation system 200. Additionally, the odometry calculator 203 may calculate measurement noise covariances for both dR and dT. Moreover, dR and dT may be calculated in the reference frame of the imaging sensor 201.

In some embodiments, the IMU 215 may provide inertial measurements in a substantially similar manner as the IMU 115, which is described above. As illustrated in FIG. 2, the IMU 215 may provide raw inertial measurements from the various inertial sensors in the IMU 215 to an inertial navigation system (INS) 211. The INS 211 may execute a strapdown algorithm, where the strapdown algorithm uses previously determined navigation parameters, or kinematic states, and the raw inertial measurements to determine updated navigation parameters for the vehicle carrying the IMU 215 such as position, velocity, and angular orientation. In some implementations, the measurement axes for the calculated navigation parameters may be aligned with the principal axes of the vehicle to which the navigation system 200 is attached, where the relationship between the frame of the IMU 215 and the frame of the imaging sensor 201 is known. Additionally, the INS 211 may receive correction information from a sensor fusion device, such as sensor fusion device 121, to correct errors that may develop in navigation parameters calculated using inertial measurements.

Further, the navigation system 200 may use a Kalman filter to perform a portion of the functions associated with the sensor fusion device 121. As part of fusing the measurements provided by the IMU 215, the GNSS receiver 207, and the imaging sensor 201 the navigation system 200 may incorporate the received measurements into a Kalman filter.

In some embodiments, as the odometry calculator 203 may provide odometry information that includes relative measurements of position and rotation (i.e., the difference between the vehicle's position and angular orientation between two time measurement epochs), the main filter 213 can be augmented using augmented information 223 for use by an integrity monitor such as the integrity monitor 123 in FIG. 1. The navigation system may implement a state cloning method to incorporate the odometry information into the sensor fusion device 121 and the processes used by the integrity monitor 123.

Traditionally, a strapdown INS (such as the INS 211) consists of sensors included in an IMU (such as IMU 215) aided by measurements received from a GNSS receiver (such as GNSS receiver 207) and a filter to estimate the position, velocity, and angular orientation of an object relative to defined reference frames. Additionally, a state vector may be defined that includes position, velocity, and angular orientation of the object associated with the navigation system 200. Further, a state error vector may be defined that includes the position error, velocity error, angular orientation error, and various IMU and GPS sensor errors. A traditional INS may integrate the state vector forward in time outside the Kalman filter. Further, the sensor fusion device 121 may propagate the state error vector (and associated statistics) within the Kalman filter and compares the provided GNSS measurements to this state error vector (and associated statistics) resulting in an innovation vector. An error state Kalman filter operates on the innovation vector (and its statistics) to compute corrections to the state error vector. The corrections to the state error vector statistics (mean and covariance) are used to correct the vehicle state vector at periodic intervals.

In certain embodiments, the sensor fusion device 121 may be augmented using the augmented information 223 received from the odometry calculator 203. For example, two consecutive image frames may be acquired by the imaging sensor 201 at different time epochs $t_1$ and $t_2$. The image processor 237 and the odometry calculator 203 may process the different image frames to determine the relative translation (dT) and changes to the relative angular orientation (dR) of the imaging sensor 201 between the epochs $t_1$ and $t_2$. The measurements of dT and dR (and any associated statistics) may be used to augment the information used by the main filter 213, the sub-filter 243, and the sub-sub-filter 217.

As the statistics of dT and dR are a function of the position and angular orientation of the imaging sensor 201 at time epochs $t_1$ and $t_2$, in some implementations, the state error vector statistics at time epoch $t_1$ may be augmented with an additional copy of the position and angular orientation statistics at time epoch $t_1$. In particular, the error statistics of the state vector may be propagated to time epoch $t_2$ while maintaining a copy of the position and angular orientation statistics from time epoch $t_1$. For example, the main filter 213, the sub-filter 243, and the sub-sub-filter 217 may maintain augmented information 223, which includes a copy of the estimated position and angular orientation of the state error vector statistics at time epoch $t_1$, computes the state error vector statistics at time epoch $t_2$, and computes a cross covariance of the position and angular orientation statistics of the state error vector between time epochs $t_1$ and $t_2$.

In summary, the use of information related to both time epochs $t_1$ and $t_2$ may be referred to herein as a state cloning method. In greater detail, a state cloning method, based on the measurements provided by the imaging sensor 201, may include, at time epoch $t_1$, using a copy of the position and angular orientation statistics of the state error vector to augment the state error vector. Further, a state covariance matrix may be augmented to be consistent with the augmented state vector by replicating the submatrices corresponding to the augmented states (the position and angular orientation of the state error vector at time epoch $t_1$). Additionally, a state transition matrix (F) and a process noise mapping matrix (G) may be respectively augmented with identity and zero matrices corresponding to the augmented state error vector statistics.

Further, a state cloning method may include, within the Kalman filter, propagating the augmented state error vector and associated statistics from time epoch $t_1$ to time epoch $t_2$. As a result, the augmented state error vector statistics may include an estimate of the position and angular orientation of the navigation system 200 at time epochs $t_1$ and $t_2$ and the cross covariance of the position and angular orientation of the navigation system 200 at time epochs $t_1$ and $t_2$.

Further, a state cloning method may include, at time epoch $t_2$, computing measurements of dR and dT (and associated statistics) using data from the image frames acquired by the imaging sensor 201 at time epochs $t_1$ and $t_2$. Additionally, at time epoch $t_2$, the measurements dR and dT (and associated statistics) may be expressed as a function of the augmented state vector error statistics at time epoch $t_2$. Further, a corresponding measurement model may be used in the correction step of the Kalman filter with the dR and dT measurements and associated statistics. Moreover, after the correction step, the method deletes the augmented position and angular orientation state error vector statistics associated with the time epoch $t_1$.

In certain embodiments, the state cloning method described above is repeated for every pair of consecutive images processed by the navigation system 200. Further, a mathematical description of the state cloning method described above may include defining a state vector for the stochastic system of the object containing the navigation system 200. For example, the state error vector may be defined as follows:

$$X = [\delta r^T \psi^T E^T]^T.$$

As shown, $\delta r$ may correspond to the error of the 3D vehicle position, $\psi$ may correspond to the error of the 3D angular orientation, and E corresponds to additional vehicle error states (e.g. 3D velocity, IMU biases, GPS pseudorange bias, GPS receiver clock bias, and additional states that correspond to other aiding sensors). Further, a state error covariance matrix may be defined as:

$$P = \begin{bmatrix} P_{rr} & P_{r\psi} & P_{rE} \\ P_{\psi r} & P_{\psi\psi} & P_{\psi E} \\ P_{Er} & P_{E\psi} & P_{EE} \end{bmatrix}$$

Let the first image of a pair of consecutive images (two measurement epochs) be acquired at time epoch $t_1$. At this time epoch, the estimated state error vector and state error covariance matrix are augmented by cloning the position and angular orientation states as follows:

$$\hat{X}_{AUG}(t_1) = \begin{bmatrix} \widetilde{\delta r}_{t1} \\ \hat{\psi}_{t1} \\ \hat{E}_{t1} \\ \widetilde{\delta r}_{t1} \\ \hat{\psi}_{t1} \end{bmatrix}; P_{AUG} = \begin{bmatrix} \begin{bmatrix} P_{rr,t1} & P_{r\psi,t1} & P_{rE,t1} \\ P_{\psi r,t1} & P_{\psi\psi,t1} & P_{\psi E,t1} \\ P_{Er,t1} & P_{E\psi,t1} & P_{EE,t1} \end{bmatrix} \begin{bmatrix} P_{rr,t1} & P_{r\psi,t1} \\ P_{\psi r,t1} & P_{\psi\psi,t1} \end{bmatrix} \\ \begin{bmatrix} P_{rr,t1} & P_{r\psi,t1} & P_{rE,t1} \\ P_{\psi r,t1} & P_{\psi\psi,t1} & P_{\psi E,t1} \end{bmatrix} \begin{bmatrix} P_{rr,t1} & P_{r\psi,t1} \\ P_{\psi r,t1} & P_{\psi\psi,t1} \end{bmatrix} \end{bmatrix}$$

The additional subscript $t_1$ indicates that the numerical values of the elements of the state error vectors statistics at time $t_1$ are sampled and copied into the augmented matrix.

Additionally, a state transition matrix F may be augmented as follows:

$$F_{AUG} = \begin{bmatrix} F & 0 \\ 0 & I \end{bmatrix}.$$

The augmented state transition matrix may represent that the augmented states are estimates of the position and angular orientation at time $t_1$ and their values are maintained constant to time $t_2$. Also, a process noise covariance matrix may be augmented with zeros corresponding to the augmented states as the statistics of these states are not affected by uncertainty, or process noise, during the prediction step.

At time epoch $t_2$, the imaging sensor 201 may acquire a second image frame of a pair of consecutive images and the two images may be processed by the image processor 237 and the odometry calculator 203 to compute the measurement statistics of the relative position dT and angular orientation dR. For example, let $C_{A,t}{}^B$ represent the direction cosine matrix (DCM) from frame A to frame B at time t. The DCM matrix may be a function of the 3D angular orientation states, $\Phi(t)$. Also, let $C_B{}^{IS}$ be the DCM matrix from the body frame to the imaging sensor frame, assumed to be a known, constant matrix. Moreover, ECEF may refer to measurements in the earth center earth fixed (ECEF) frame, and W may refer to measurements in a wander azimuth frame. Given the above, the odometry calculator 203 may calculate the relative translation dT as follows:

$$dT^{ECEF} = T_k{}^{ECEF} - T_{k-1}{}^{ECEF}$$

$$dT_{k-1}{}^{IS} = C_{ECEF,k-1}{}^{IS}(r_k{}^{ECEF} - r_{k-1}{}^{ECEF})$$

$$dT = dT_{k-1}{}^{IS} = (C_B{}^{IS} C_{W,k-1}{}^B C_{ECEF,k-1}{}^W) (r_k{}^{ECEF} - r_{k-1}{}^{ECEF})$$

where the change in position of the imaging sensor frame, $dT_{k-1}{}^{IS}$, is expressed at time $t_{k-1}$. The change in position is resolved in the ECEF frame because $r^{ECEF}$ is known from the INS 211. When the imaging sensor 201 is a monocular camera, dT may be unique up to a scale factor for a single measurement epoch. Thus, dT may be normalized to a unit vector as follows:

$$d\hat{T} = \frac{dT}{\|dT\|}$$

Additionally, the odometry calculator 203 may calculate rotation information dR as follows:

$$C_{IS,k-1}{}^{IS,k} C_{ECEF,k-1}{}^{IS} = C_{ECEF,k}{}^{IS}$$

$$C_{IS,k-1}{}^{IS,k} = C_{ECEF,k}{}^{IS} C_{IS,k-1}{}^{ECEF}$$

$$dR = dR_{IS,k-1}{}^{IS,k} = C_{IS,k-1}{}^{IS,k} = C_{ECEF,k}{}^{IS} C_{IS,k-1}{}^{ECEF}$$

where the relative rotation between two imaging sensor frames is the DCM from the imaging sensor frame at time $t_{k-1}$ to the ECEF frame pre-multiplied by the DCM from the ECEF frame to the imaging sensor frame at time $t_k$. If we use the intermediate reference frames between the ECEF frame and the imaging sensor frame, we can rewrite the expression for dR as follows:

$$dR = (C_B{}^{IS} C_{W,k}{}^B C_{ECEF,k}{}^W)(C_B{}^{IS} C_{W,k-1}{}^B C_{ECEF,k-1}{}^W)^T$$

During the time epochs $t_{k-1}$ to $t_k$, the state mean error vector and the state error covariance matrix are propagated using the standard Kalman filter equations, which may incorporate any other error states that correspond to available sensor measurements (such as measurements provided by the GNSS receiver 207).

The predicted state error vector estimates at time epoch $t_2$, before incorporation of the odometry information, may be as follows:

$$\hat{X}_{AUG}(t_2^-) = \begin{bmatrix} \widetilde{\delta r}_{t2} \\ \hat{\psi}_{t2} \\ \hat{E}_{t2} \\ \widetilde{\delta r}_{t1} \\ \hat{\psi}_{t1} \end{bmatrix}.$$

As seen, the estimates of the 3D position and the 3D angular orientation at time $t_1$ as well as at time $t_2$ are available in the augmented state error vector at time $t_2$. Additionally, the non-linear functions that govern the state vector may be linearized to compute linear functions that govern the state error vector.

If $\xi$ is defined as the error in the DCM dR, then the equations for dR may be rewritten as follows:

$$(1-\xi\times)\widehat{dR}=(C_B^{IS}\hat{C}_{W,k}^B(I-\phi_k^W\times)(I+\delta\theta_k^W\times)\hat{C}_{EFEF,k}^W)$$
$$(C_B^{IS}\hat{C}_{W,k-1}^B(I-\phi_{k-1}^W\times)I+\delta\theta_{k-1}^W\times)\hat{C}_{ECEF,k-1}^W)^T$$

where (*) × refers to the skew-symmetric matrix operator. Applying the small angle assumption such that $$\phi\delta\theta\sim 0$$

the equation for dR may be rearranged into the following $$\xi\times=A(\psi_k^W\times)A^T-B(\psi_{k-1}^W\times)B^T,$$

where $$A=C_B^{IS}\hat{C}_{W,k}^B$$

and $$B=(C_B^{IS}\hat{C}_{W,k}^B\hat{C}_{ECEF}^W)\hat{C}_{ECEF,k-1}^{W\ T}.$$

Additionally, using the following result:
If y=Ax and A is orthonormal, then y×=A[x ×]A$^T$
the equation for dR may be rewritten as:

$$\xi=A\psi_k^W-B\psi_{k-1}^W.$$

Also, defining $\delta dT$ as the error in dT, the above equations for dT can be rewritten as:

$$\delta dT=C_B^{IS}\hat{C}_{W,k-1}^B(\delta r_k^W-\delta r_{k-1}^W)-(\widehat{dT}\times)\psi_k^W.$$

When the imaging sensor 201 is a monocular camera, the measurement provided from the imaging sensor 201 is a unit vector. Accordingly, the equations for dT can be linearized to be:

$$\delta\widehat{dT}=M\delta dT,$$

where $$M = \frac{(\|dT\|^2 I_3 - dTdT^T)}{\|dT\|^3}\delta dT.$$

In summary, the resulting measurement error vector for the monocular camera is as follows $$\gamma y=[\delta\widehat{dT}^T\xi^T]\text{hu }T=H_{CAM}X_{AUG},$$

where the measurement matrix is as follows $$H_{CAM} = \begin{bmatrix} (MC_B^{IS}C_{W,k-1}^B) & -M(\widehat{dT}\times) & 0 & -(MC_B^{IS}\hat{C}_{W,k-1}^B) & 0 \\ 0 & A & 0 & 0 & B \end{bmatrix}.$$

In some implementations, the linearized models, $F_{AUG}$, may be used for the prediction step of the Kalman filter. The linearized measurement model may be used for the update step of the Kalman filter.

Once the measurements provided by the odometry calculator 203 are incorporated into the Kalman filter using the correction step, the cloned state for position and angular orientation at time $t_1$ and the corresponding partitions of the covariance matrix may be discarded. The state cloning process may then be repeated starting at time step $t_2$ for the next available odometry information and the prediction and correction steps of the Kalman filter where the position and angular orientation at time $t_2$ are cloned for propagation to time $t_3$.

In certain embodiments, the navigation system 200 may also perform a solution separation method 235 to determine the integrity of measurements provided by the odometry calculator 203 and measurements from other sources, such as the GNSS receiver 207, and the state vector estimated by the navigation system 200.

In some implementations, a specific subset of measurements may be used to estimate the statistics of elements of a state vector. For example, given two different statistical estimates of a particular element obtained from dissimilar subsets of measurements, the resultant estimates may be checked for consistency given the cross covariance between the two estimates. Additionally, a standard threshold test may be used to check for the consistency of the difference between the two estimates using the expected uncertainty of their differences.

In some implementations, an objective of the solution separation method may be the computation of protection limits such that the probability that the estimation error of the corresponding state element is greater than the protection limit is less than a requirement. For example, the probability that the estimation error is greater than the protection limit is less than a probability of hazardously misleading information. For instance, a horizontal protection limit (HPL) may be computed such that the probability of an estimation error for the horizontal position is greater than a computed HPL is less than the probability of hazardously misleading information.

In certain embodiments, the integrity monitor 123 may check the integrity of the GNSS antenna/receiver 107 and its measurements 109 using a position estimate $\hat{x}_0$ that is computed using all of the available measurements. Under the hypothesis that none of the measurements used to compute $\hat{x}_0$ are faulty (i.e. hypothesis $H_0$), and given a probability $P_{FF}$ of fault free integrity failure, the HPL can be computed as:

$$HPL_{H0}=\lambda_0^{1/2}Q^{-1}(P^{FF}/2N),$$

where Q(.) represents the right-half tail probability of the Gaussian probability density function given by the following equation:

$$Q(x) = \frac{1}{\sqrt{2\pi}}\int_x^\infty e^{-\frac{t^2}{2}}dt.$$

The variable $\lambda_0$ is the largest eigenvalue of the error covariance matrix of $\hat{x}_0$. $\lambda_0 \geq 0$ as the error covariance matrix is positive semi-definite. The value of $P_{FF}$ is chosen as a fraction of the prescribed probability of hazardous misleading information $P_{HMI}$. For example, $P_{HMI}$ can be divided equally among sub-filters 243.

Further, given a second estimate of position $\hat{x}_j$ computed from a subset of the measurements (by excluding measurement j) and the separation covariance matrix $P_{0j}$ of the difference between the position estimates $\hat{x}_0-\hat{x}_j$, the norm of the difference or 'separation' between the two estimates is:

$$d=\|\hat{x}_0-\hat{x}_j\|,$$

where d is referred to as the discriminator. Given a probability of false detection $P_{FA}$, a threshold D may be calculated as follows:

$$D=\lambda_{0j}^{1/2}Q^{-1}(P_{FA}/2),$$

where $\lambda_{0j}$ is the largest eigenvalue of $P_{0j}$. The separation covariance matrix, $P_{0j}$, is calculated as follows:

$$P_{0j} = E\left[\delta x_{0j} \delta x_{0j}^T\right] = E\left[\left[(x_0 - x_j) - (\hat{x}_0 - \hat{x}_j)\right]\left[(x_0 - x_j) - (\hat{x}_0 - \hat{x}_j)\right]^T\right] =$$

$$E\left[[x_0 - \hat{x}_0][x_0 - \hat{x}_0]^T\right] - E\left[[x_0 - \hat{x}_0][x_j - \hat{x}_j]^T\right] - E\left[[x_j - \hat{x}_j][x_0 - \hat{x}_0]^T\right] +$$

$$E\left[[x_j - \hat{x}_j][x_j - \hat{x}_j]^T\right] = P_0 - P_{0j}^{cross} - \left(P_{0j}^{cross}\right)^T + P_j$$

$P_{0j}^{cross} \equiv$ covariance between main filter 0 and sub-filter $j$.

Further, a fault may be declared when d>D. If the method declares a fault when d>D, then the probability of a false alarm would be $P_{FA}$ according to the error statistics of $\hat{x}_0$ and $\hat{x}_j$.

Under the hypothesis $H_j$ that there exists an undetected fault in the $j^{th}$ measurement, the HPL may be computed as follows:

$$HPL_{H_j} = D + a$$

where $a = \lambda_j^{1/2} Q^{-1}(P_{MD})$, $\lambda_j$ is the largest eigenvalue of the error covariance matrix of $\hat{x}_j$, and $P_{MD}$ is the probability of missed detection of a fault in $\hat{x}_j$. We use the sum (D+a) to capture the worst case scenario where the two underlying errors are in opposite directions.

In the event that no fault is detected, the HPL for the estimate $\hat{x}_0$ may be computed as:

$$HPL = \max(HPL_{H_0}, HPL_{H_j})$$

The above solution separation test may be used to detect faults using N measurements; and to determine an HPL for the estimate $\hat{x}_0$ in the case of no fault being detected.

In some embodiments, the HPL may provide the horizontal region of protection at the required integrity limit given the presence of an undetected fault. Thus, given a particular alert limit for a certain application, if the value of HPL is higher than the alert limit, the system is declared unsafe for use. While the above described calculations apply to the calculation of the HPL, similar calculations may be performed when calculating the vertical protection limit (VPL) as well. The navigation system 200 may include a protection level computation 205 that provides a protection level output 209 for use by other computing systems or for use within the navigation system 200. Also, the protection level computation 205 may provide an alert output 239 for notifying other computing systems or other components within the navigation system 200 that a fault has occurred.

In certain embodiments, the values of the probabilities $P_{FA}$, $P_{MD}$, and $P_{FF}$ may be derived from system requirements. For example, a value for the probability of hazardous misleading information $(P_{HMI})$ may be $10^{-7}$/hr and may be defined as part of the application requirements. Additionally, the false alert rate $(P_{FA})$ may have an exemplary value of $10^{-5}$/hr and also be defined as part of the application requirements. The satellite fault probability $(P_{SF})$ may have an exemplary value of $10^{-5}$/hr and be considered the probability of a single satellite failure. The imaging sensor measurement fault probability $P_{ISF}$ may have an exemplary value of $10^{-5}$/hr and may be obtained through camera reliability data or through the judgment of engineers or other system designers.

In certain embodiments, the probability of missed detection $(P_{MD})$ may be computed as follows:

$$P_{MD} = (P_{HMI} - P_{FF})/(NP_{SF} + P_{FF}),$$

where N is the number of satellites. Further, the fault free failure probability is computed as:

$$P_{FF} = \eta_{FF} P_{HMI},$$

where $\eta_{FF}$ may be equal to 0.4 or other number as determined by an engineer or other individual associated with the system.

In further embodiments, where the solution separation method incorporates measurements from the imaging sensor 201, the probability PFA may be selected as for GPS as the $P_{FA}$ may represent the allocation of the false alarm rate across the available measurements. Further, the value of probability of imaging sensor 201 measurement failure, such as for an imaging sensor $P_{ISF}$, may be selected a priori based on experience with the reliability of the imaging sensor 201 and failure data for the imaging sensor 201.

Additionally, as the solution separation method 235 implemented by the navigation system 200 may use N sub-filters to detect a faulty measurement and N!/(N−2)!*2!) sub-sub-filters to identify and exclude the faulty measurement, where each sub-filter 243 and sub-sub-filter 217 operates on a subset of the N possible measurements. Further, the sub-sub-filters 217 may provide an output to an exclusion level computation 219. The exclusion level computation 219 may provide a fault identification 229 and exclusion level output 231 to another computing system or used within the navigation system 200.

In some embodiments, to calculate the exclusion level, the integrity monitor 123 may perform a similar algorithm to the fault detection, however, as stated above, with the calculation of exclusion levels there is an additional layer of filters. As stated above, with the solution separation method, there is a main filter 213 to calculate the main solution, sub-filters 243 to detect the faulty measurement using the solution separation method, and sub-sub-filters 217 to identify the faulty measurement and calculate the exclusion level.

In calculating the exclusion level, the integrity monitor 123 may use the estimated state (error) vector statistics calculated by the main filter 213, the sub-filters 243, and the sub-sub-filters 217, where the estimated state vectors may be represented as follows:

Main filter: $x_{00}$;

Sub-filters: $x_{0n} \forall n = [1, N]$; and

Sub-sub-filters: $x_{nm} \forall n = [1,N]$; $m = [1, N] \forall m \neq n$.

Additionally, the integrity monitor 123 may calculate test statistics such as a discriminator or consistency indicator. For example, the integrity monitor 123 may calculate a discriminator using the Euclidean norm of the appropriate elements of the sub-filters 243 and the sub-sub-filters 217. The integrity monitor 123 or the exclusion level computation 219 may calculate the discriminator as the distance between a sub-filter state vector and an associated sub-sub-filter state vector as follows:

$$dx_{nm} = x_{0n} - x_{nm}$$

$$d = \|dx_{nm}\|_2$$

Further, the integrity monitor 123 or exclusion level computation 219 may calculate a separation covariance matrix, $dP_{nm}$, as follows:

$$dP_{nm} = E[\delta x_{nm}\delta x_{nm}^T] =$$

$$E[(\delta x_{0n} - \delta x_{nm})(\delta x_{0n} - \delta x_{nm})^T] = E[\delta x_{0n}\delta x_{0n}^T] - E[\delta x_{0n}\delta x_{nm}^T] -$$

$$E[\delta x_{nm}\delta x_{0n}^T] + E[\delta x_{nm}\delta x_{nm}^T] = P_{0n} - P_{nm}^{cross} - (P_{nm}^{cross})^T + P_{nm}$$

$P_{nm}^{cross} \equiv$ covariance between sub-filter $n$ and sub-sub-filter $m$.

When the separation covariance matrix is calculated, the integrity monitor 123 or the exclusion level computation 219 may calculate an exclusion threshold, $D_{nm}$, as follows:

$$D_{nm} = K_{FA}\sqrt{\lambda^{dP_{nm}}},$$

where $\lambda^{dP_{nm}}$ is the largest eigenvalue of $dP_{nm}$ and $$K_{FA} = Q^{-1}\left(\frac{P_{FA}}{2(N-1)}\right).$$

In additional embodiments, the exclusion level computation 219 may raise an alarm identifying a measurement source as being faulty (fault ID 229) regarding a fault when the following condition exists:

$$d_{rm} < D_{rm} \forall m \neq r$$

and $$d_{nm} \geq D_{nm} \text{ for at least one } m \neq n \forall n \neq r.$$

If a sub-filter n is separated from the main filter 0 by more than the threshold, then n is possibly the failed satellite. If a sub-filter n is separated from at least one of its sub-sub-filters by more than the exclusion threshold, then satellite n is not the faulty satellite because the contribution of the failed satellite is still included in sub-filter n. If sub-filter r is separated from each of its sub-sub-filters by less than the exclusion threshold, then satellite r is the faulty satellite provided each of the other sub-filters is separated from at least one of its sub-sub-filters by more than the exclusion threshold. In some embodiments, when a source of information is identified as faulty, the main filter 213, sub-filter 243, and sub-sub-filter 217 may be reinitialized using the sub-filter r as the main filter to exclude the measurements produced by the faulty measurement source.

Further, the exclusion level computation 219 may calculate exclusion levels for the various sources of measurements as follows:

$$EL_n = \max(D_{nm} + a_{nm})$$

where $a_{nm}$ incorporates the covariance matrix of the sub-sub-filters 217 and the probability of missed detection, $P_{MD}$. Also, the uncertainty effect of the sub-sub-filter 217 may be calculated as $$a_{nm} = K_{MD}\sqrt{\lambda^{P_{nm}}},$$

where $\lambda^{P_{nm}}$ is the largest eigenvalue of $P_{nm}$ and $$K_{MD} = Q^{-1}(P_{MD}).$$

The exclusion level computation 219 may provide an exclusion level output 231 for use by other systems or the navigation system 200. As used herein, the exclusion level may be an error bound that contains the main filter's state error vector (e.g. position) to a probability of $1-P_{FE}$ following exclusion of the faulty satellite, where $P_{FE}$ is the probability of failed exclusion. A failed exclusion may occur if the separation between a sub-filter 243 (that includes measurements from a faulty measurement source) and one of the sub-sub-filters 217 is less than the calculated exclusion threshold. In some implementations, an exclusion level (horizontal exclusion level, vertical exclusion level, etc.) may be the worst case separation over all N sub-filters for the main solution and may be calculated as follows:

$$EL = \max(D_{0n} + a_{0n}).$$

Further, the effect of a fault-free rare normal condition may be ignored with respect to exclusion, because exclusion occurs only when a failure is detected.

In certain embodiments, where measurements from the imaging sensor 201 are included in the solution separation method 235, the navigation system 200 may include image sensing modifications 241, where the image sensing modifications 241 are changes to the solution separation method 235 to determine the integrity of measurements provided by the imaging sensor 201 in combination with measurements from other information sources. For example, the image sensing modifications 241 may include incorporating the measurements associated with the various satellites in communication with the GNSS receiver 207 as well as the odometry information provided by the odometry calculator 203. In particular, the odometry information may be incorporated using a state cloning method such as the state cloning method described above.

In additional embodiments, the image sensing modifications 241 may include increasing the total number of measurements from N to N+1. Accordingly, the N+1 measurements include N pseudorange measurements from N satellites in communication with the GNSS receiver 207 and 1 measurement from the imaging sensor 201 that includes dR, dT, and accompanying statistics. As such, the main filter 213 may calculate a full solution using the N+1 measurements. Further, the image sensing modifications 241 may include defining an additional sub-filter 243, where the additional sub-filter 243 excludes the measurement provided by the imaging sensor 201 and includes the N satellite measurements. Accordingly, the standard solution separation method described above may be used to calculate protection levels (such as the horizontal protection level and the vertical protection level).

In further embodiments, the image sensing modifications 241 may also increase the number of sub-sub filters 217 from $N!/((N-2)!*2!)$ sub-sub filters 217 to $(N+1)!/((N-1)!*2!)$ sub-sub filters 217 where there are an additional N sub-sub filters 217 added due to the (N+1)th sub-filter 243. Moreover, with the additional sub-sub filters 217, the methods described above for calculating exclusion levels and identifying faults may be used with the addition of the measurements from the imaging sensor 201 with the N measurements from the GNSS receiver 207. Accordingly, by incorporating the image sensing modifications 241 to the solution separation method 235, the navigation system 200 may determine the integrity of measurements provided by the odometry calculator 203.

Figure 3:
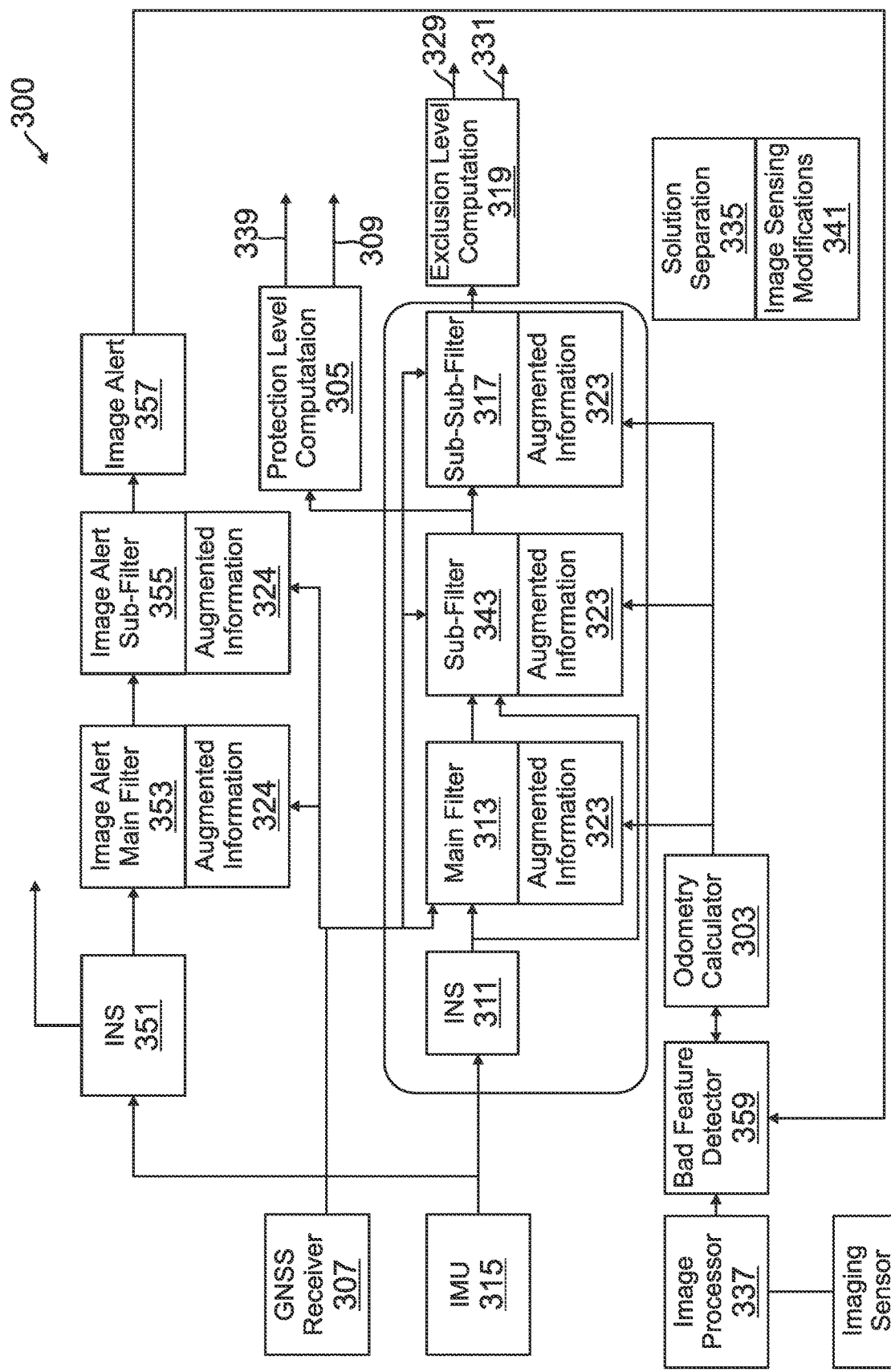
FIG. 3 is a block diagram of a system for determining whether matched features identified in different images captured by an imaging sensor are faulty according to an aspect of the present disclosure.

FIG. 3 is a block diagram of a navigation system 300 that uses data from a GNSS receiver 307 and an IMU 315 to determine whether or not processed information associated with an imaging sensor 301 is faulted. In certain embodiments, the navigation system 300 may include an imaging sensor 301, an image processor 337, an odometry calculator 303, a GNSS receiver 307, and an IMU 315 that function substantially similar to the imaging sensor 201, the image processor 237, the odometry calculator 203, the GNSS receiver 207, and the IMU 215 described above in relation to FIG. 2.

Additionally, the navigation system 300 may monitor the integrity of measurements produced by the GNSS receiver 307 and the imaging sensor 301 (via the odometry calculator 303) in a similar manner to the integrity monitoring performed by the navigation system 200 in FIG. 2. For example, an INS 311 may function in a similar manner to the INS 211. Also, augmented information 323 may be similar to the augmented information 223 in FIG. 2. Moreover, a main filter 313, a sub-filter 343, and a sub-sub-filter 317 may be similar to the main filter 213, the sub-filter 243, and the sub-sub-filter 217. Further a protection level computation 305, an exclusion level computation 319, a solution separation method 335, and an image sensing modifications 341 may be similar to the protection level computation 205, the exclusion level computation 219, the solution separation method 235, and the image sensing modifications 241. Also, the navigation system 300 provides an alert output 339, a protection level output 309, a fault identification output 329, and an exclusion level output 331 that are similar to the alert output 239, a protection level output 209, the fault identification output 229, and the exclusion level output 231 in FIG. 2.

In certain embodiments, the navigation system 300 may use measurements from the IMU 315 and the GNSS receiver 307 to determine whether processed information from the imaging sensor 301 is faulty. As illustrated, the IMU 315 may provide information to multiple INSs. In particular, the IMU 315 provides inertial measurements to the INS 311 for integrity monitoring purposes and to the INS 351. The INS 351 may use the inertial measurements from the IMU 315 to calculate position, velocity, and angular orientation of the navigation system 300. The INS 351 may provide the position, velocity, and angular orientation calculations to an external system and/or an image alert main filter 353.

In further embodiments, to determine whether processing information from the imaging sensor 301 is faulty, the navigation system may use an image alert main filter 353 and an image alert sub-filter 355. The image alert main filter 353 and the image alert sub-filter 355 may function in a similar manner to the main filter 213 and the sub-filter 243 in FIG. 2. In particular, the image alert main filter 353 and the image alert sub-filter implement the solution separation method 335 on the measurements from the INS and the GNSS receiver 307 to determine whether any measurements from the GNSS receiver 307 are faulty. Additionally, the state (error) mean vector and state (error) covariance matrix at time epoch $t_{k-1}$ $$X_{k-1} = [\delta r_{k-1}^T \; \psi_{k-1}^T \; E_{k-1}^T]^T,$$

$$P_{k-1} = \begin{bmatrix} P_{rr,k-1} & P_{r\psi,k-1} & P_{rE,k-1} \\ P_{\psi r,k-1} & P_{\psi\psi,k-1} & P_{\psi E,k-1} \\ P_{Er,k-1} & P_{E\psi,k-1} & P_{EE,k-1} \end{bmatrix},$$

may be augmented with augmented information 324 by cloning the position and angular orientation states from time epoch $t_{k-1}$ only if the GNSS measurements and the position estimated by the image alert main filter 353 and image alert sub-filter 355 pass the integrity tests described above at time epoch $t_{k-1}$:

$$\hat{X}_{AUG}(t_{k-1}) = \begin{bmatrix} \widehat{\delta r}_{k-1} \\ \hat{\psi}_{k-1} \\ \hat{E}_{k-1} \\ \widehat{\delta r}_{k-1} \\ \hat{\psi}_{k-1} \end{bmatrix};$$

$$P_{AUG}(t_{k-1}) = \begin{bmatrix} \begin{bmatrix} P_{rr,k-1} & P_{r\psi,k-1} & P_{rE,k-1} \\ P_{\psi r,k-1} & P_{\psi\psi,k-1} & P_{\psi E,k-1} \\ P_{Er,k-1} & P_{E\psi,k-1} & P_{EE,k-1} \end{bmatrix} \begin{bmatrix} P_{rr,k-1} & P_{r\psi,k-1} \\ P_{\psi r,k-1} & P_{\psi\psi,k-1} \\ P_{Er,k-1} & P_{E\psi,k-1} \end{bmatrix} \\ \begin{bmatrix} P_{rr,k-1} & P_{\psi\psi,k-1} & P_{rE,k-1} \\ P_{\psi r,k-1} & P_{\psi\psi,k-1} & P_{\psi E,k-1} \end{bmatrix} \begin{bmatrix} P_{rr,k-1} & P_{r\psi,k-1} \\ P_{\psi r,k-1} & P_{\psi\psi,k-1} \end{bmatrix} \end{bmatrix}.$$

The procedure indicated above is used to predict the augmented state error vector and state covariance matrix at time epoch $t_k$ $$\hat{X}_{AUG}(t_k^-) = \begin{bmatrix} \widehat{\delta r}_k \\ \hat{\psi}_k \\ \hat{E}_k \\ \widehat{\delta r}_{k-1} \\ \hat{\psi}_{k-1} \end{bmatrix};$$

$$P_{AUG}(t_k^-) = \begin{bmatrix} \begin{bmatrix} P_{rr,k} & P_{r\psi,k} & P_{rE,k} \\ P_{\psi r,k} & P_{\psi\psi,k} & P_{\psi E,k} \\ P_{Er,k} & P_{E\psi,k} & P_{EE,k} \end{bmatrix} \begin{bmatrix} P_{rr,k-1} & P_{r\psi,k-1} \\ P_{\psi r,k-1} & P_{\psi\psi,k-1} \\ P_{Er,k-1} & P_{E\psi,k-1} \end{bmatrix} \\ \begin{bmatrix} P_{rr,k-1} & P_{\psi\psi,k-1} & P_{rE,k-1} \\ P_{\psi r,k-1} & P_{\psi\psi,k-1} & P_{\psi E,k-1} \end{bmatrix} \begin{bmatrix} P_{rr,k-1} & P_{r\psi,k-1} \\ P_{\psi r,k-1} & P_{\psi\psi,k-1} \end{bmatrix} \end{bmatrix}.$$

The pseudorange measurements from the GNSS receiver 307 may be used to correct the state (error) mean vector and state (error) covariance matrix to calculate an updated state (error) mean vector and state (error) covariance matrix at time epoch $t_k$. The image alert main filter 353 and image alert sub-filter 355 may use the method described above to calculate the discriminator, threshold, and protection level for the estimated horizontal and vertical position and the solution separation methods 335 may be used to determine the integrity of the GNSS measurements and the position estimated by the image alert main filter 353 and image alert sub-filter 355 at time epoch $t_k$. In contrast to the integrity monitor 123 that also performs exclusion calculations and fault identification, the image alert main filter 353 and the image alert sub-filter 355 may be used to determine whether a satellite fault occurs independent of the imaging sensor 301, but as there is no sub-sub filter, the outputs from the image alert main filter 353 and the image alert sub-filter 355 are provided to an image alert 357. The image alert main filter 353 and the image alert sub-filter 355 may provide an indication to the image alert 357 that indicates whether a fault exists in the measurements provided through the GNSS receiver 307 and the estimates of position of the navigation system 300 calculated by the image alert main filter 353. If the integrity tests performed by the solution separation method 335 pass for the state (error) mean vector and state (error) covariance matrix at time epochs $t_{k-1}$ and $t_k$, then the GNSS measurements from the GNSS receiver 307 and the augmented state vector and augmented state covariance matrix estimated by the image alert main filter 353 are used by the image alert 357 to calculate dR, dT, and associated statistics independent of the imaging sensor 301:

$$dR = (C_B{}^{IS} C_{W,k}{}^B C_{EFCE,k})(C_B{}^{IS} C_{W,k-1}{}^B C_{ECEF,k-1}{}^W)^T,$$

$$dT = (C_B{}^{IS} C_{W,k}{}^B C_{ECEF,k}{}^W) r_k{}^{ECEF} - r_{k-1}{}^{ECEF}).$$

Moreover, dR, dT, and their statistics are then used by the bad feature detector 359 to test feature matches. Since the equations for dR and dT are non-linear, these matrices and their statistics may be calculated using the Unscented Transform or other methods known to those skilled in the art. If the integrity tests performed by the solution separation method 335 do not pass at time epochs $t_{k-1}$ and $t_k$, then the image alert 357 doesn't pass any information to the bad feature detector 359.

In some embodiments, when the image alert 357 determines that the measurements from the GNSS receiver 307 are fault free and the estimated position of the navigation system 300 passes the integrity tests, the image alert 357 may compute a dR, dT, and associated statistics from the augmented state vector estimate for the navigation system 300 using the measurements from the GNSS receiver 307 and the IMU 315. The image alert 357 may then provide the estimates of dR, dT, and the associated statistics to a bad feature detector 359. The bad feature detector 359 may use the estimates of dR, dT, and the associated statistics to test low level data from the imaging sensor 301 and the odometry calculator 303. For example, the image processor 337 may provide information regarding matched feature pairs found in consecutively acquired image frames to the odometry calculator 303. The bad feature detector 359 may test the matched feature pairs acquired from the image processor 337 and processed by the odometry calculator 303 against the received estimates of dR, dT, and the associated statistics from the image alert 357. At time epoch tk, the bad feature detector 359 may use the following tests to identify bad feature matches that contribute to the dR, dT, and associated statistics calculated by the odometry calculator 303 using features matched by the image processor 337

$$(dT_k^{oc,303} - dT_k^{ia,357})^T (P_{dT,k}^{oc,303} + P_{dT,k}^{ia,357})^{-1}$$
$$(dT_k^{oc,303} dT^{ia,357}) \leq D_{dT}$$

$$\|dR_k^{oc,303} (dR_k^{ia,357})^T\|_2 \leq D_{dR},$$

where $D_{dT}$ and $D_{dR}$ refer to thresholds selected by the user to identify bad feature matches. Other similar tests can be selected by those with skill in the art. The image processor 337 may match features across consecutive imaging sensor frames and calculate dR, dT, and associated statistics using the available features or a subset of the available features. If the dR, dT, and associated statistics computed by the image processor 337 using the available features pass the two threshold tests given above, then there are no faulty feature matches causing bad odometry measurements. If the dR, dT, and associated statistics computed by the image processor 337 using the available features fail either one or both of the two threshold tests given above, then there is at least one faulty feature match causing bad odometry measurements. Multiple methods, known to those skilled in the art, may be used to identify the bad feature match or matches. One method for identifying the bad feature match follows from the solution separation method 335. If there are G possible matched features, then G sub-solutions are calculated for dR, dT, and associated statistics using G-1 matched features by the image processor 337. If the dR, dT, and associated statistics computed by the image processor 337 using the G-1 features pass the two threshold tests given above, then the excluded matched feature pair is the faulty feature match causing bad odometry measurements. There are other techniques for using combinations of matched feature pairs that use the threshold tests known to those skilled in the art, however, these techniques also perform comparisons to the dR, dT, and associated statistics computed by image alert 357.

The bad feature detector 359 may label matched pairs that contribute to odometry information like dR, dT, and their associated statistics that are not consistent with the acquired state vector estimate as faulty and may prevent the faulty matched pairs from being used in later calculations. Accordingly, when the odometry calculator 303 receives a finalized set of matched feature pairs from the bad feature detector 359, the odometry calculator 303 may only use matched pairs that are consistent with the fault free state vector estimate calculated by the image alert 357 when calculating odometry information like dR, dT, and their associated statistics.

Figure 4:
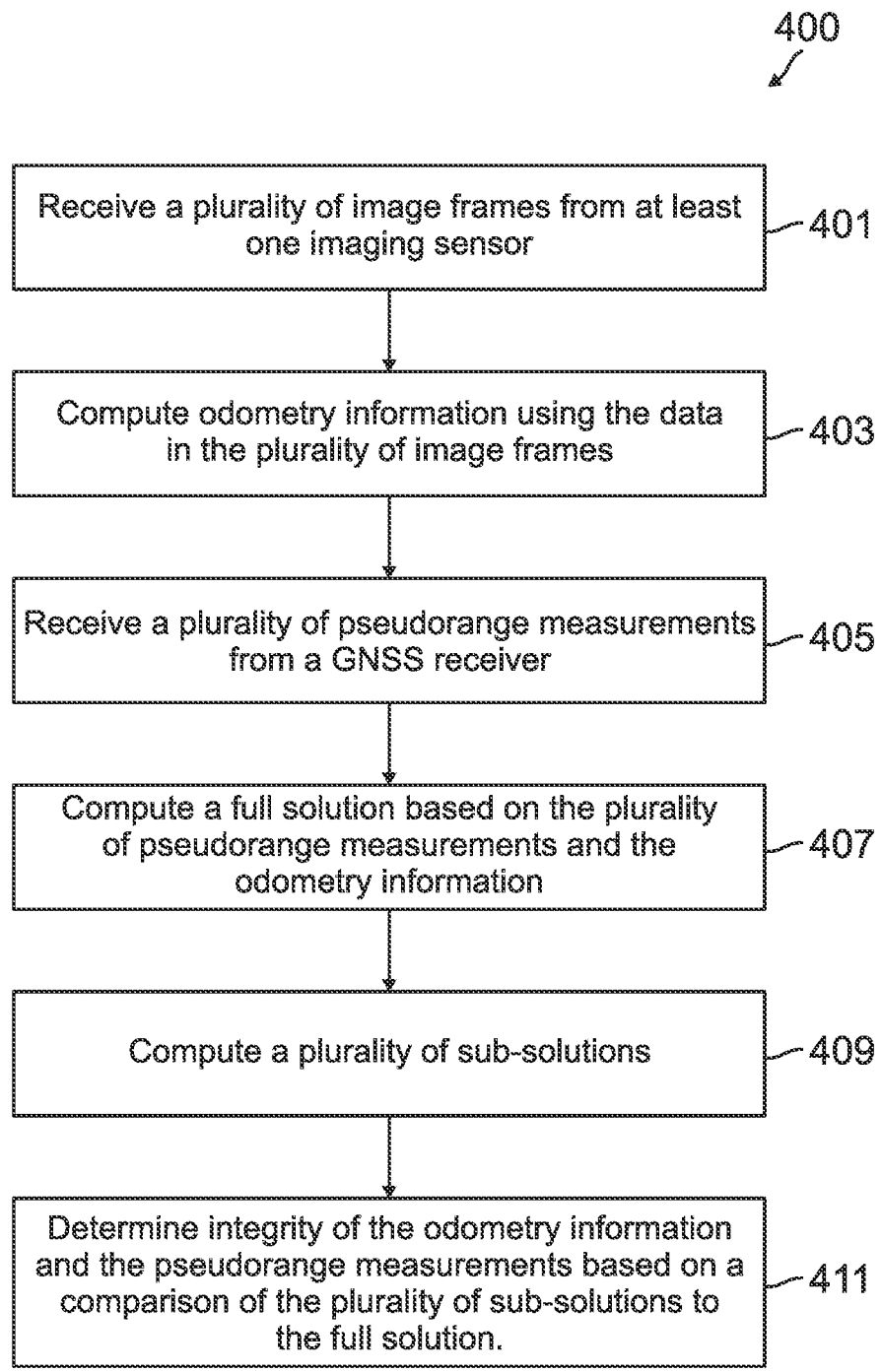
FIG. 4 is a flowchart diagram of a method for performing integrity monitoring of odometry information within a navigation system according to an aspect described in the present disclosure.

FIG. 4 is a flowchart diagram of a method 400 for monitoring the integrity of odometry measurements in a navigation system. As shown, method 400 proceeds at 401, where a plurality of image frames from at least one imaging sensor are received. For example, at different times, an imaging sensor may acquire image frames that contain data that describes features within an environment. Also, method 400 proceeds at 403, where odometry information is computed using the data in the plurality of image frames. For example, an image processor may identify matching features in two different image frames that were acquired at different times. Based on the differences between the matched features, an odometry calculator may calculate odometry information representing the change in position and angular orientation of the imaging sensor between the different times when the imaging sensor acquired the different image frames.

In some embodiments, the method 400 proceeds at 405, where a plurality of pseudorange measurements are received from a GNSS receiver. Also, the method 400 proceeds at 407, where a full solution is computed based on the plurality of pseudorange measurements and the odometry information. Further, the method 400 proceeds at 409, where a plurality of sub-solutions are computed. For example, in calculating sub-solutions, at least one of the pseudorange measurements and the odometry information is not used to compute each sub-solution in the plurality of sub-solutions. Additionally, the odometry information is not used in the computation of at least one sub-solution in the plurality of sub-solutions. Moreover, the method 400 proceeds at 411, where integrity of the odometry information and the pseudorange measurements are determined based on a comparison of the plurality of sub-solutions to the full solution.

EXAMPLE EMBODIMENTS

Example 1 includes a system comprising: one or more imaging sensors configured to generate a plurality of image frames from optical inputs; a global navigation satellite system (GNSS) receiver configured to provide pseudorange measurements; and one or more computational devices configured to receive the plurality of image frames and the pseudorange measurements, wherein the one or more computational devices are configured to: compute odometry information from two or more image frames in the plurality of image frames, wherein the two or more image frames were acquired at different times; calculate a full solution for the system based on the pseudorange measurements and the odometry information; calculate a plurality of sub-solutions for the system based on subsets of the pseudorange measurements and the odometry information, wherein at least one sub-solution in the plurality of sub-solutions is not based on the odometry information; and determine the integrity of the pseudorange measurements, the odometry information, and a position estimated by the navigation system based on a comparison of the full solution and the plurality of sub-solutions.

Example 2 includes the system of Example 1, wherein the one or more computational devices calculate the full navigation solution and the plurality of sub-solutions using the odometry information produced at different times implementing a state cloning method.

Example 3 includes the system of Example 2, wherein implementation of the state cloning method by the one or more computational devices comprises: augmenting a state vector and a state covariance matrix with the state vector and state covariance matrix information associated with a first time; propagating the augmented state vector from the first time to a second time; computing the odometry information based on image frames acquired at the first time and the second time; correcting the augmented state vector information using the GNSS pseudorange measurements and the odometry information; and deleting the augmented state vector information associated with the first time.

Example 4 includes the system of any of Examples 1-3, wherein the one or more computational devices are further configured to: calculate a plurality of sub-sub-solutions for each sub-solution; and determine which of the pseudorange measurements and the odometry information is faulty based on a comparison of the plurality of sub-sub-solutions to the associated sub-solution.

Example 5 includes the system of Example 4, wherein the one or more computational devices are further configured to exclude pseudorange measurements and the odometry information that is determined to be faulty from calculations of a navigation solution.

Example 6 includes the system of any of Examples 1-5, wherein the one or more computational devices determine the integrity by calculating one or more protection levels based on the full solution and the plurality of sub-solutions.

Example 7 includes the system of any of Examples 1-6, wherein the odometry information comprises position change information and rotation information.

Example 8 includes the system of any of Examples 1-7, further comprising a bad feature detector that determines whether matched features in two or more image frames are faulty based on the pseudorange measurements.

Example 9 includes the system of Example 8, wherein the bad feature detector determines that the matched features are faulty when the pseudorange measurements are identified as fault free using a solution separation method without the odometry information.

Example 10 includes the system of any of Examples 1-9, further comprising an inertial measurement unit that provides inertial measurements of the system.

Example 11 includes a method comprising: receiving a plurality of image frames from at least one imaging sensor, wherein each image frame in the plurality of image frames contains data describing an environment visible to the at least one imaging sensor; computing odometry information using the data in the plurality of image frames; receiving a plurality of pseudorange measurements from a global navigation satellite system receiver, each pseudorange measurement in the plurality of pseudorange measurements associated with a different satellite; computing a full solution based on the plurality of pseudorange measurements and the odometry information; computing a plurality of sub-solutions, wherein at least one of the pseudorange measurements and the odometry information is not used to compute each sub-solution in the plurality of sub-solutions, wherein the odometry information is not used in the computation of at least one sub-solution in the plurality of sub-solutions; and determining integrity of the odometry information, the pseudorange measurements, and a position estimated by the navigation system based on a comparison of the plurality of sub-solutions to the full solution.

Example 12 includes the method of Example 11, wherein the full solution and the sub-solutions incorporate the odometry information using a state cloning method.

Example 13 includes the method of Example 12, wherein incorporating the odometry information using the state cloning method further comprises: augmenting a state vector and a state covariance matrix with the state vector and state covariance matrix associated with a first time; propagating the augmented state vector from the first time to a second time using a Kalman filter; computing the odometry information based on image frames acquired at the first time and the second time; correcting the augmented state vector with the Kalman filter state estimations; and deleting the state vector information associated with the first time.

Example 14 includes the method of any of Examples 11-13, further comprising: calculating a plurality of sub-sub-solutions for at least one sub-solution in the plurality of sub-solutions; determining whether the at least one sub-solution is separated from each of the plurality of sub-sub-solutions associated with the at least one sub-solution by less than an exclusion threshold; and when the at least one sub-solution is separated from each of the associated plurality of sub-sub-solutions by less than the exclusion threshold, identifying the at least one of the pseudorange measurements or the odometry information excluded from the calculation of the at least one sub-solution as faulty.

Example 15 includes the method of Example 14, further comprising excluding the at least one of the pseudorange measurements or the odometry information from subsequent calculations of a navigation solution.

Example 16 includes the method of any of Examples 11-15, wherein determining the integrity comprises calculating one or more protection levels based on a comparison of the full solution and the plurality of sub-solutions.

Example 17 includes the method of any of Examples 11-16, wherein the odometry information comprises position change information and rotation information.

Example 18 includes the method of any of Examples 11-17, further comprising determining whether matched features in two or more image frames in the plurality of image frames are faulty based on the pseudorange measurements.

Example 19 includes the method of Example 18, wherein determining whether the matched features are faulty comprises: calculating an image alert full solution using the pseudorange measurements; calculating a plurality of image alert sub-solutions, wherein at least one of the pseudorange measurements is not used to compute each image alert sub-solution in the plurality of image alert sub-solutions; and determining whether the image alert full solution is fault free based on a comparison of the image alert sub-solutions to the image alert full solution; when the image alert full solution is fault free: providing the image alert full solution to a bad feature detector, wherein the bad feature detector compares the the odometry information calculated using the matched features against the image alert full solution; determining that the matched features are faulty based on the comparison of the matched features and the odometry information calculated using the matched features against the image alert full solution; and calculating the odometry information to be used by a navigation system using the matched features that are not determined to be faulty.

Example 20 includes a navigation system comprising: at least one imaging sensor attached to the vehicle, configured to generate a plurality of image frames, wherein an image frame comprises data describing one or more features in the environment of the navigation system; a global navigation satellite system receiver configured to produce pseudorange measurements; an odometry calculator that provides odometry information based on the plurality of image frames; a sensor fusion device that calculates a navigation solution for the object based on the pseudorange measurements and the odometry information; and an integrity monitor that assures the integrity of the pseudorange measurements, the odometry information, and a position estimated by the navigation system, wherein measuring the integrity comprises: a main filter that calculates a full solution from the pseudorange measurements and the odometry information associated with two subsequently received image frames in the plurality of image frames; one or more sub-filters that calculate a plurality of sub-solutions, wherein each sub-filter calculates a sub-solution in the plurality of sub-solutions based on a different sub-set of the pseudorange measurements and the odometry information, wherein at least one sub-filter in the one or more sub-filter calculates a sub-solution that is not based on the odometry information; and a protection level computation that determines whether a fault has occurred based on a comparison of the plurality of sub-solutions to the full solution.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that his invention be limited only be the claims and equivalents thereof.

What is claimed is:

1. A system comprising:
   one or more imaging sensors configured to generate a plurality of image frames from optical inputs;
   a global navigation satellite system (GNSS) receiver configured to provide pseudorange measurements; and
   one or more computational devices configured to receive the plurality of image frames and the pseudorange measurements, wherein the one or more computational devices are configured to:
   compute odometry information from two or more image frames in the plurality of image frames, wherein the two or more image frames were acquired at different times;
   calculate a full solution for the system based on the pseudorange measurements and the odometry information;
   calculate a plurality of sub-solutions for the system based on subsets of the pseudorange measurements and the odometry information, wherein at least one sub-solution in the plurality of sub-solutions is not based on the odometry information; and
   determine the integrity of the pseudorange measurements, the odometry information, and a position estimated by the navigation system based on a comparison of the full solution and the plurality of sub-solutions.

2. The system of claim 1, wherein the one or more computational devices calculate the full navigation solution and the plurality of sub-solutions using the odometry information produced at different times implementing a state cloning method.

3. The system of claim 2, wherein implementation of the state cloning method by the one or more computational devices comprises:
   augmenting a state vector and a state covariance matrix with the state vector and state covariance matrix information associated with a first time;
   propagating the augmented state vector from the first time to a second time;
   computing the odometry information based on image frames acquired at the first time and the second time;
   correcting the augmented state vector information using the GNSS pseudorange measurements and the odometry information; and
   deleting the augmented state vector information associated with the first time.

4. The system of claim 1, wherein the one or more computational devices are further configured to:
   calculate a plurality of sub-sub-solutions for each sub-solution; and
   determine which of the pseudorange measurements and the odometry information is faulty based on a comparison of the plurality of sub-sub-solutions to the associated sub-solution.

5. The system of claim 4, wherein the one or more computational devices are further configured to exclude pseudorange measurements and the odometry information that is determined to be faulty from calculations of a navigation solution.

6. The system of claim 1, wherein the one or more computational devices determine the integrity by calculating one or more protection levels based on the full solution and the plurality of sub-solutions.

7. The system of claim 1, wherein the odometry information comprises position change information and rotation information.

8. The system of claim 1, further comprising a bad feature detector that determines whether matched features in two or more image frames are faulty based on the pseudorange measurements.

9. The system of claim 8, wherein the bad feature detector determines that the matched features are faulty when the pseudorange measurements are identified as fault free using a solution separation method without the odometry information.

10. The system of claim 1, further comprising an inertial measurement unit that provides inertial measurements of the system.

11. A method comprising:
    receiving a plurality of image frames from at least one imaging sensor, wherein each image frame in the plurality of image frames contains data describing an environment visible to the at least one imaging sensor;
    computing odometry information using the data in the plurality of image frames;
    receiving a plurality of pseudorange measurements from a global navigation satellite system receiver, each pseudorange measurement in the plurality of pseudorange measurements associated with a different satellite;
    computing a full solution based on the plurality of pseudorange measurements and the odometry information;
    computing a plurality of sub-solutions, wherein at least one of the pseudorange measurements and the odometry information is not used to compute each sub-solution in the plurality of sub-solutions, wherein the odometry information is not used in the computation of at least one sub-solution in the plurality of sub-solutions; and determining integrity of the odometry information the pseudorange measurements, and a position estimated by the navigation system based on a comparison of the plurality of sub-solutions to the full solution.

12. The method of claim 11, wherein the full solution and the sub-solutions incorporate the odometry information using a state cloning method.

13. The method of claim 12, wherein incorporating the odometry information using the state cloning method further comprises:

augmenting a state vector and a state covariance matrix with the state vector and state covariance matrix associated with a first time;

propagating the augmented state vector from the first time to a second time using a Kalman filter;

computing the odometry information based on image frames acquired at the first time and the second time;

correcting the augmented state vector with the Kalman filter state estimations; and deleting the state vector information associated with the first time.

14. The method of claim 11, further comprising:

calculating a plurality of sub-sub-solutions for at least one sub-solution in the plurality of sub-solutions;

determining whether the at least one sub-solution is separated from each of the plurality of sub-sub-solutions associated with the at least one sub-solution by less than an exclusion threshold; and when the at least one sub-solution is separated from each of the associated plurality of sub-sub-solutions by less than the exclusion threshold, identifying the at least one of the pseudorange measurements or the odometry information excluded from the calculation of the at least one sub-solution as faulty.

15. The method of claim 14, further comprising excluding the at least one of the pseudorange measurements or the odometry information from subsequent calculations of a navigation solution.

16. The method of claim 11, wherein determining the integrity comprises calculating one or more protection levels based on a comparison of the full solution and the plurality of sub-solutions.

17. The method of claim 11, wherein the odometry information comprises position change information and rotation information.

18. The method of claim 11, further comprising determining whether matched features in two or more image frames in the plurality of image frames are faulty based on the pseudorange measurements.

19. The method of claim 18, wherein determining whether the matched features are faulty comprises:

calculating an image alert full solution using the pseudorange measurements;

calculating a plurality of image alert sub-solutions, wherein at least one of the pseudorange measurements is not used to compute each image alert sub-solution in the plurality of image alert sub-solutions; and determining whether the image alert full solution is fault free based on a comparison of the image alert sub-solutions to the image alert full solution;

when the image alert full solution is fault free:

providing the image alert full solution to a bad feature detector, wherein the bad feature detector compares the odometry information calculated using the matched features against the image alert full solution;

determining that the matched features are faulty based on the comparison of the matched features and the odometry information calculated using the matched features against the image alert full solution; and calculating the odometry information to be used by a navigation system using the matched features that are not determined to be faulty.

20. A navigation system comprising:

at least one imaging sensor attached to the vehicle, configured to generate a plurality of image frames, wherein an image frame comprises data describing one or more features in the environment of the navigation system;

a global navigation satellite system receiver configured to produce pseudorange measurements;

an odometry calculator that provides odometry information based on the plurality of image frames;

a sensor fusion device that calculates a navigation solution for the object based on the pseudorange measurements and the odometry information; and an integrity monitor that assures the integrity of the pseudorange measurements, the odometry information, and a position estimated by the navigation system wherein measuring the integrity comprises:

a main filter that calculates a full solution from the pseudorange measurements and the odometry information associated with two subsequently received image frames in the plurality of image frames;

one or more sub-filters that calculate a plurality of sub-solutions, wherein each sub-filter calculates a sub-solution in the plurality of sub-solutions based on a different sub-set of the pseudorange measurements and the odometry information, wherein at least one sub-filter in the one or more sub-filter calculates a sub-solution that is not based on the odometry information; and a protection level computation that determines whether a fault has occurred based on a comparison of the plurality of sub-solutions to the full solution.

* * * * *